United States Patent [19]

Bothien et al.

[11] Patent Number: 5,256,031
[45] Date of Patent: Oct. 26, 1993

[54] DEVICE AND METHOD FOR REDUCING ONE OR MORE RESONANT VIBRATIONS OF ROTOR BLADES IN TURBOMACHINES

[75] Inventors: Mihaylo-Rüdiger Bothien, Waldshut-Tiengen, Fed. Rep. of Germany; Christian Wüthrich, Fislisbach, Switzerland

[73] Assignee: Asea Brown Boveri Ltd., Baden, Switzerland

[21] Appl. No.: 952,259

[22] Filed: Sep. 28, 1992

[30] Foreign Application Priority Data

Oct. 17, 1991 [CH] Switzerland .................. 3045/91

[51] Int. Cl.⁵ ................................. F01D 5/10
[52] U.S. Cl. ........................ 415/1; 415/119; 415/914
[58] Field of Search ............ 415/119, 914, 118.1

[56] References Cited

U.S. PATENT DOCUMENTS

| | | | |
|---|---|---|---|
| 4,086,022 | 4/1978 | Freeman et al. | 415/119 |
| 4,540,335 | 9/1985 | Yamaguchi et al. | 415/914 |
| 4,714,406 | 12/1987 | Hough | 415/914 |
| 4,781,530 | 11/1988 | Lauterbach et al. | 415/914 |

FOREIGN PATENT DOCUMENTS 2090334 7/1982 United Kingdom .

*Primary Examiner*—John T. Kwon
*Attorney, Agent, or Firm*—Burns, Doane, Swecker and Mathis

[57] ABSTRACT

In a device for reducing resonant vibrations of rotor blades in turbomachines, cavities for the selective disturbance of the flow are arranged between the rotating blade tip and that wall of the casing which bounds the flow duct. These cavities are arranged in the casing wall in the region of the blade tips and comprise a plurality of cavities arranged over the circumference. Their open cross section facing the flow duct is arranged in the axial planes bounded by the inlet edges and outlet edges of the rotor blades.

2 Claims, 3 Drawing Sheets

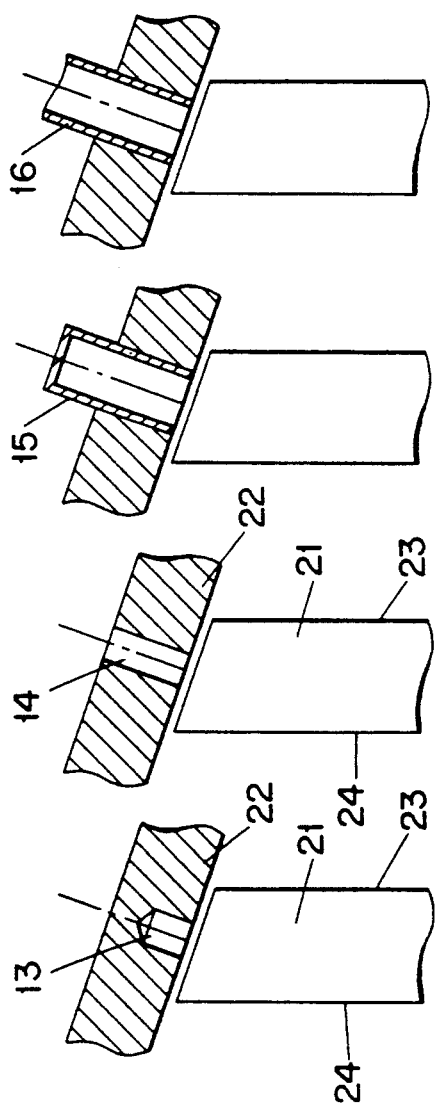
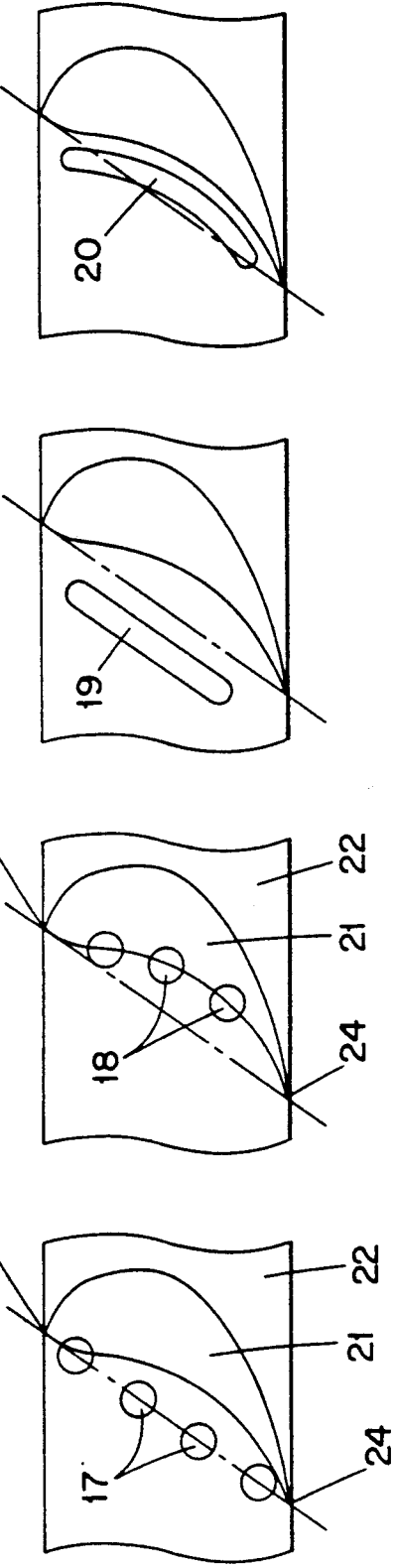

DEVICE AND METHOD FOR REDUCING ONE OR MORE RESONANT VIBRATIONS OF ROTOR BLADES IN TURBOMACHINES

BACKGROUND OF THE INVENTION

1. Field of the Invention

The invention relates to a device for reducing one or more resonant vibrations of rotor blades in turbomachines, means for the selective disturbance of the flow being arranged between the rotating blade tip and that wall of the casing which bounds the flow duct. It also relates to a method for constructing and operating the device.

In turbomachines such as turbines, compressors, turbopumps and fans both of the axial-flow and of the radial-flow type, the rotor blades are excited into vibrations by irregularities in the flow. If the speed or the speed multiples of the rotor coincide with the natural frequency of a rotor blade, resonant vibrations and hence high mechanical stresses can arise which can shorten the life of the blades in an impermissible manner. In the case of machines with a variable speed, the occurrence of resonances must be expected at any time. However, even in the case of machines with a constant operating speed, the resonance speeds are generally so low that several resonances have to be passed through during starting and stopping.

2. Discussion of Background

Known devices for reducing vibrations are the customary damping wires, which limit the vibration amplitudes of the blades. Shroud plates or shroud bands are also used. Such measures are generally associated with efficiency losses and/or are costly.

SUMMARY OF THE INVENTION

The invention tries to avoid these disadvantages. Accordingly, one object of the invention is to provide novel means for disturbing the flow, which can be used for selective influencing of detected resonances.

According to the invention, this is achieved in devices of the type stated at the outset by virtue of the fact that these means are arranged in the casing wall in the region of the blade tips and comprise at least one cavity, which is arranged over the circumference and the open cross section of which facing the flow duct is arranged at least partially between the axial planes bounded by the inlet edge and the outlet edge of the rotor blades.

The invention starts from the underlying idea that physical modifications in the casing wall lead to an additional excitation of the blades which, as long as its magnitude and phase are correctly chosen, is capable of significantly reducing the amplitudes of the vibrations in one or more resonances.

The advantages of the invention are to be seen inter alia in the simplicity of the new measure and in the fact that existing machines can be retrofitted without difficulty with the disturbance means. In addition, no significant impairment of efficiency need be anticipated from the arrangement of cavities.

The cavities, provided in the form of holes or grooves, can be either closed at one end or penetrate the casing wall completely and be open towards the outside. In the latter case, there is the possibility of blowing a gaseous medium onto the rotor blade tips in order to be able to vary the extent of the additional excitation.

A method for setting up and operating the device is distinguished by the fact that the rotary frequency causing the resonance is determined and wherein, in the case of a blade vibration to be suppressed, excited by the $k^{th}$ rotary frequency of the rotor, the cavities disturbing the flow are distributed over the circumference in such a way that an excitation with the $k^{th}$ multiple of the rotary frequency takes place, the sum of the angular positions of the successive cavities in the circumferential direction being chosen so that the blade vibrations are reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A–1D each show a partial longitudinal section through the rotor blading of an axial-flow turbomachine in various embodiments;

FIGS. 2A–3B show the partial development of a cylinder section on the outside diameter of the annular duct through which flow occurs, in various embodiments;

FIG. 4 shows a partial longitudinal section through the rotor blading of a radial-flow turbomachine;

DESCRIPTION OF THE PREFERRED EMBODIMENTS

Figure 5A:
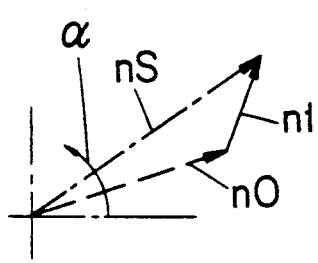
FIGS. 5A–5C show vector diagrams in connection with the 5th order vibration.
Figure 5B:
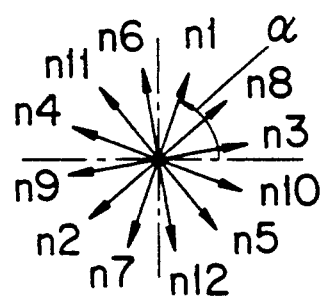
Figure 5C:
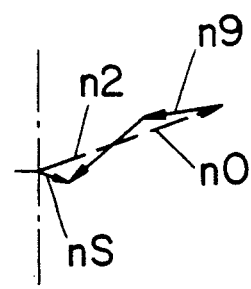

Referring now to the drawings, wherein only those elements which are essential for understanding the invention are shown and wherein like reference numerals designate identical or corresponding parts throughout the several views, in the case of FIGS. 1 to 4 these are the rotor blades 21 and the casing walls 22 bounding the duct through which flow occurs. In the case of the example, FIGS. 1 to 3 show turbine blades which seal against a conical duct contour with their tips. 23 denotes the corresponding inlet edges and 24 denotes the outlet edges of the blades. In the radial-flow machine according to FIG. 4, these edges cannot be seen due to the only partial representation of the rotor blades 21.

In FIGS. 1A to 1D, the cavities are in the form of cylindrical holes which extend perpendicularly to the conical duct contour. This perpendicular course is of course not compulsory. The open cavity cross section facing the flow duct is in each case situated within the circumferential surface which is bounded by the axial planes of the inlet edges 23 and the outlet edges 24. If the rotor blades have tapered profiles, these axial planes are determined by the respective edges at the blade tip.

The hole in accordance with FIG. 1A is a simple blind hole 13. In general, the hole will be provided with an internal thread (not shown), into which a bolt can be screwed to close the hole.

The hole in accordance with FIG. 1B is a through hole 14. This solution can be used to advantage in machines in which the pressure differences prevailing between the flow duct and the outer wall of the casing are only small, as is the case, for example, with fans.

The cavity in accordance with FIG. 1C likewise comprises a through hole, into which a tube 15 closed at the outside is inserted. This variant could be used in machines with thin-walled casings or in cases in which a certain closed cavity volume proved to be necessary.

As a departure from the last-mentioned variant, FIG. 1D shows a through hole into which a tube 16 open at the outside has been inserted. This offers the possibility of providing gas connections (not shown) and of blowing a gaseous medium into one or more or all of the cavities distributed over the circumference. Appropriate tests with an axial-flow turbine have confirmed the feasibility of this measure. At a certain rotor speed in the machine tested, a resonance excited by the quintuple of the rotor speed was detected. Compressed air was subsequently injected through just three holes. The injected air flow was increased until the amplitude of the first natural frequency of the rotor blades when excited with the quintuple speed decreased to 30% of the original value and hence to an acceptable figure.

According to FIG. 2A, the cavities are holes arranged in groups. A group has a plurality of individual holes 17 which are staggered along a line in the direction of the chain-dotted chord of the rotor blades. As a departure from this, FIG. 2B shows a solution in which, although the individual holes 18 again extend in the direction of the chord of the blades, their centers are staggered along a curve. The shape of the curve preferably corresponds to the shape of the blade profile at the pressure side.

In FIG. 3A, the grouped individual holes in accordance with FIG. 2A are replaced by a straight groove 19, the axis of which extends in the direction of the chords of the rotor blades. As a variant of this, FIG. 3B shows a curved groove 20, the curvature of which again corresponds to the shape of the profile of the blade pressure side.

FIG. 4 shows the illustrative embodiment with straight grooves 19' in a radial compressor. In its casing wall 22, here a shroud ring, 6 such grooves have been milled in at an angular interval of in each case 60°, being oriented in accordance with the blade contour. In tests, the length and depth of the grooves was varied in such a way that the amplitude of the blade vibration when excited with the quadruple of the rotary frequency was reduced to less than 20% of the original value.

The physical reason for the additional excitation caused by the cavities is that a partial pressure compensation takes place briefly between the pressure side and the suction side of the blade tip as it passes the cavity. The blade tip is thereby subjected in each case to a brief shock.

Figure 8A:
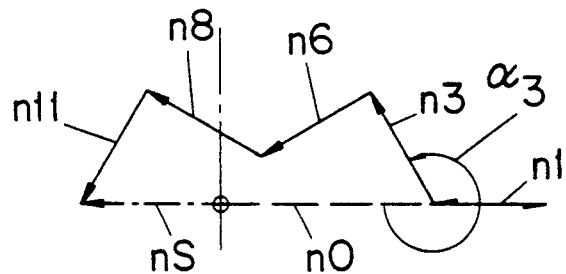
FIGS. 8A–9 show vector diagrams relating to the example in FIG. 7.
Figure 8B:
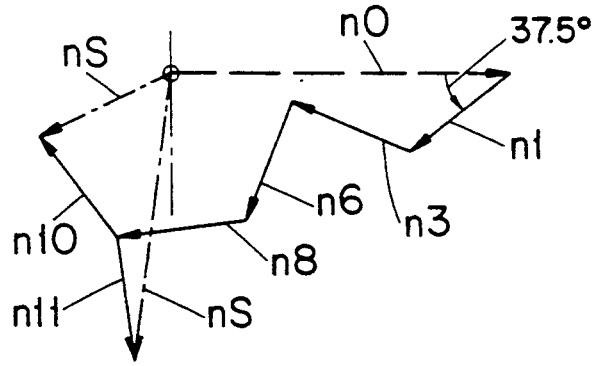

The correct selection of the means disturbing the flow for a given rotor blading will be explained below with reference to the vector diagrams in FIGS. 5A to 6B and the diagrammatic sketches in FIGS. 7 to 8B. An arrangement with 12 holes in accordance with FIG. 1A, arranged uniformly over the circumference, is assumed. The holes are numbered in sequence from 1 to 12 over the circumference. It goes without saying that absolute values cannot be given here since these would be insufficiently meaningful in any case due to their dependence on all too numerous parameters. Merely as a guide, it may be stated that the rotor blades concerned are the rotor blades of a single-stage axial-flow gas turbine, such as those used, for example, in exhaust turbochargers, that the blading comprises 45 exposed blades, not provided with binding or damping wire, with a chord length of about 30 mm, and that the wall holes have a diameter of 8 mm and a depth of 10 mm.

First of all, the blade vibrations are measured at resonance with the holes closed. This measurement is performed in a manner known per se by means of strain gauges. The subsequent Fourier analysis gives the excitation order and the amplitude and phase relation of the vibration. In the case of the example, let it be assumed that the 5th order and 24th order vibrations are to be reduced. These originally present vibrations are plotted in the case of the 5th order in FIG. 5A by the chain-dotted vector n0 and in the case of the 24th order in FIG. 6A by the dashed-line vector. In each of the diagrams, $\alpha$ denotes the phase angle of the vibration and n denotes the amplitude. From FIGS. 5A and 6A, it can be seen that the originally present 5th order and 24th order vibrations have a different phase relation and amplitude.

One of the holes, for example hole No 1 is now opened and the measurement at resonance is repeated. The Fourier analysis carried out once again now gives the resultant vibrations nS in FIG. 5A and nS in FIG. 6A, respectively, represented by the chain-dotted vectors.

The influence of hole No. 1 can now be taken from the diagrams. The shift from n0 to nS and from nO to nS is to be ascribed to the effect of hole 1. The amplitude and phase angle of the effective vectors n1 and n1, respectively, are thus known.

However, knowledge of the effective vector n1 simultaneously provides knowledge of all 12 effective vectors n1 to n12, more specifically on the basis of the following considerations: the uniform distribution of the 12 holes over the circumference, which has been assumed, results in a spatial staggering of the holes of 360°/12=30°. The 5th excitation order means that the blade to be measured vibrates five times for one revolution of the rotor. One full blade vibration thus extends over 360°/5=72 angular degrees. The 30° spacing between 2 holes thus corresponds to (360/72)×30=150° phase difference. With this data, it is now possible to plot effective vectors n2 to n12 on the basis of the effective vector n1 determined. From FIG. 5B it can be seen that vectors n2, n3, n4 etc. for hole Nos. 2, 3, 4 are each phase-shifted by 150° relative to vectors n1, n2, n3 etc. for the preceding hole Nos. 1, 2, 3 in the direction of rotation.

One now has the means to determine the cavities whose opening is capable of reducing the 5th order resonant vibration n0 for example. In the present case hole No. 9 and No. 2 can be opened in accordance with FIG. 5C. By simple vector addition of vectors n9 and n2 to vector n0, the resultant vibration nS is obtained.

However, at this point in time, it is not yet clear whether this same measure is capable of reducing or even eliminating the 24th order vibration. Comparison of vector diagrams 6a and 5a shows that the effect n1 of hole No. 1 on the 24th order vibration is different from its effect n1 on the 5th order vibration.

Figure 6A:
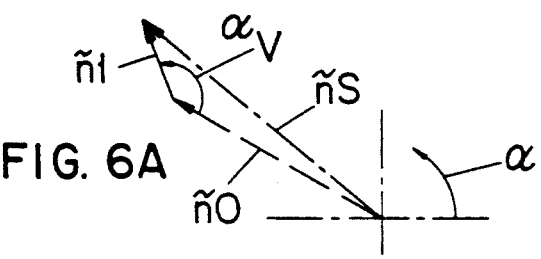
FIGS. 6A–6B show vector diagrams in connection with the 24th order vibration.
Figure 6B:
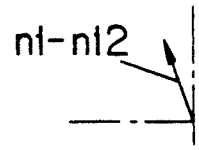

If the vector diagram for all 12 cavities is now plotted, it can be seen from FIG. 6B that all the cavities act in phase. With such an arrangement, it is thus not possible to achieve a reduction by opening holes 2 and 9. On the contrary this leads to a further stimulation of the vibration. A remedy here would be to displace all 12 holes by an angle which corresponds in its magnitude to one 24th of the phase angle αV between the original vibration n0 and n1 (−n12). As a result, the phase relation of the effective vectors n2 and n9 would correspond, in the opposite direction (rotated through 180°), to that of vibration n0, which would then be at least partially eliminated.

However, this displacement of the holes would have an influence on the 5th order vibration, the optimized damping of which (by means of the opening of holes 2 and 9) carried out above would now be called into question again.

This state of affairs is explained below with reference to FIGS. 7 and 8, which differ from the magnitudes for amplitude and phase angle selected in FIG. 5.

Figure 7:
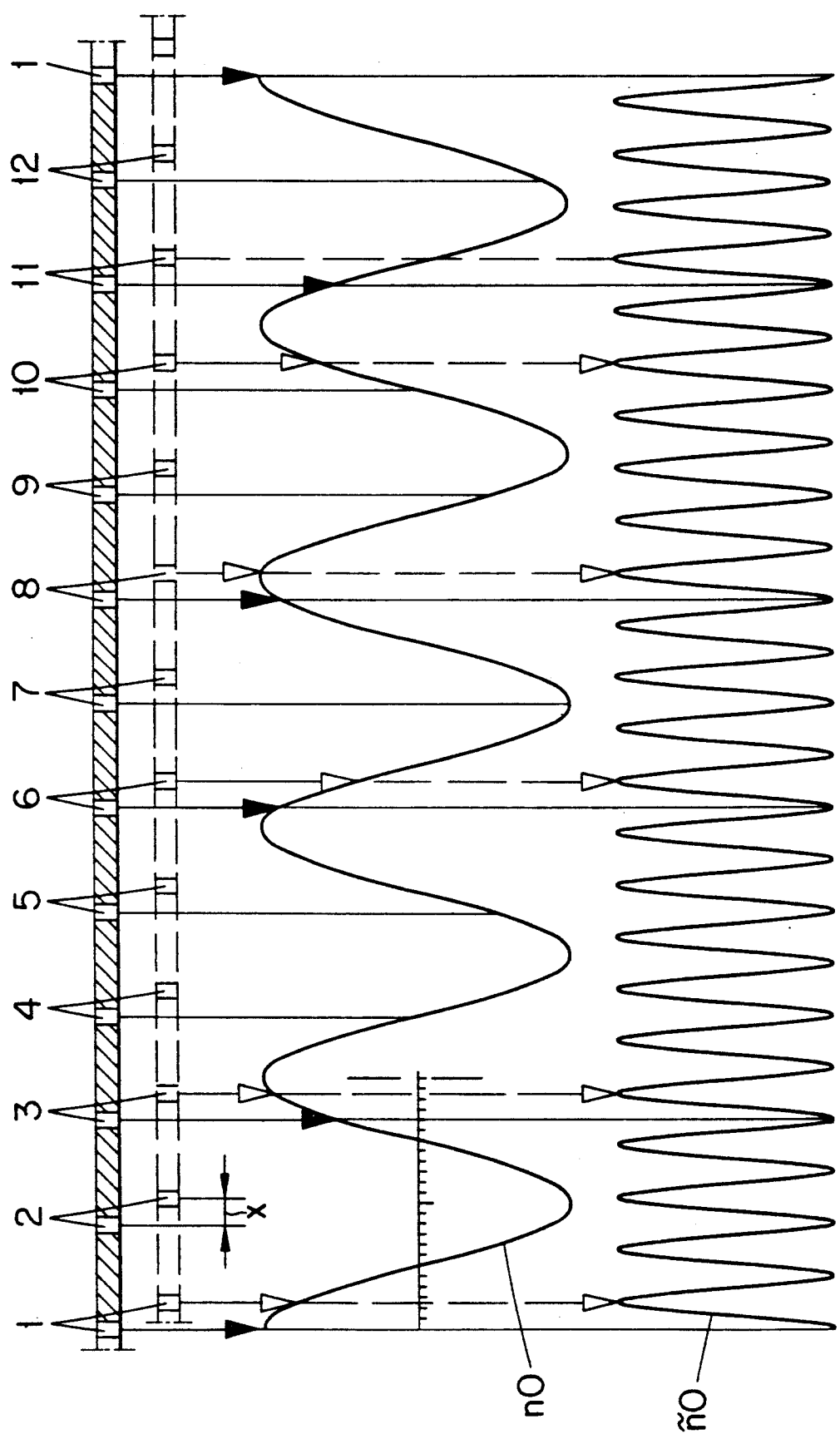
FIG. 7 shows an illustrative embodiment using the development of a cross section through the plane of the cavities.

FIG. 7 shows in the development the holes, numbered 1 to 12, over the circumference of the casing wall. For greater clarity, the 5th order and 24th order vibrations to be damped are represented one below the other. According to FIG. 8A, it is assumed that the phase angle determined for vibration n0 is 0°. It is furthermore assumed that the effective vector n1 of the first open hole has a phase angle of 180°. This assumption is fully justified if a rotatable casing ring is imagined and, for the measurements, the ring is rotated until the resultant vibration nS determined in the Fourier analyses has a smaller amplitude for a constant phase angle than the originally present vibration n0 with hole No. 1 closed.

In FIG. 7, this is represented such that hole 1 is situated in the angular plane in which the excursion of the originally present vibration n0 has the maximum value. It should be noted at this point that the arrows drawn in FIG. 7 as a vertical extension of the holes are in no way to be regarded as force vectors. Irrespective of what actually happens, the vertical arrows denote only the position of the open holes and their phase relation to the originally present vibrations.

In the example, hole Nos. 1, 3, 6, 8 and 11 are open, as indicated by the black arrows. In accordance with what has been stated above, the phase angle α3 of effective vector n3 must thus be shifted by $(360°/72) \times (2 \times 30) = 300°$ relative to the phase angle of effective vector n1, referred to vibration n0. In FIG. 7, this can be seen from the scale represented in the region of the first vibration, in which each division corresponds to 15°. The vectorial summation of the effective vectors $n0 + n1 + n3 + n6 + n8 + n11$ carried out in FIG. 8A gives the resultant vibration nS. It can be seen that an even larger reduction of the originally present vibration could be achieved simply by opening holes 1, 3 and 6.

Figure 9:
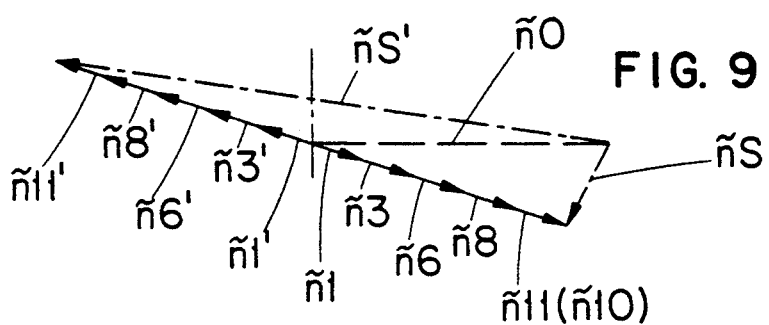

The opening of the same holes has a quite different effect on the 24th order vibration n0. According to FIG. 7, hole 1 is situated in the angular plane in which the excursion of the originally present vibration has the minimum value. According to what has been stated thus far, this means that, instead of acting in the opposite direction, the effective vector n1 acts in the same direction as vector nO. This state of affairs is represented in FIG. 9, it being assumed for the purpose of clarification that effective vector n1 is slightly phase-shifted relative to the originally present vibration n0. This has the consequence that the vibration is not reduced but is in fact further stimulated by the action of hole No. 1. This is of course all the more so when it comes to the cumulative effect of the holes 1, 3, 6, 8 and 11 which are open in the example, as shown by vector $nS = n0 + n1' + n3' + n6' + n8' + n11'$.

To remedy this, the 12 holes are displaced such that the effective vector of the additional excitation is turned through 180°. In the case of 24 vibrations per revolution, this means a displacement of the holes by $(360/24)/2 = 7.5°$. In FIG. 7, this value is indicated by X. The casing wall shown in broken lines shows the holes shifted in this way. The originally present vibration is influenced in the "correct" direction by this measure, as can be seen from the resultant vibration nS in FIG. 9. The number of holes to be opened depends on the extent of the desired amplitude reduction. The effect of the open holes on the other vibrations to be reduced must of course still be taken into account since, although the aim is to reduce the 24th order amplitude, this must be done without causing an additional excitation in the 5th order at the same time.

This is because this displacement of the holes by the amount X necessarily has an effect on the 5th order vibration. Relative to this vibration, the effect of hole No. 1 is now phase-shifted by $(360°/72) \times 7.5 = 37.5°$, as can be seen from the scale in FIG. 7. Accordingly, the effective vectors of all the holes 1, 3, 6, 8 and 11 involved must, in accordance with FIG. 8B, likewise be phase-shifted by 37.5°. The resulting vibration nS', although phase-shifted relative to vibration n0, differs only insignificantly from the latter in its magnitude. This is due, in particular, to effective vector n11, which in this special case points in completely the wrong direction.

Thus in order to influence the 5th order vibration in the desired way, i.e. to reduce the amplitude, hole 11 will in this case be closed and hole 10 will be opened instead. In sum, this gives, in accordance with FIG. 8B, the resultant effective vector nS, which is similar in absolute value to that in FIG. 8A. This change of hole has no effect on the 24th order vibration since, of course, as already explained, the vectors n1 to n12 acting there are all in phase.

The latter finding likewise shows that it is possible to influence the 24th order amplitude significantly by opening a number of holes which act in phase opposition to the 5th order and are there neutral in terms of excitation. According to vector diagram 5B, these are, for example, hole pairs $1+7$ or $2+8$ or $3+9$ etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for operating a device for reducing one or more resonant vibrations of rotor blades in turbomachines including at least one cavity provided in a casing wall in the region of rotor blade tips for disturbing a flow between a rotating blade tip and the casing wall which bounds a flow duct, said cavities being arranged over a circumference of the casing, and arranged at least partially between axial planes bounded by an inlet edge and an outlet edge of the rotor blades at an open cross section of the circumference facing the flow duct, comprising the steps of:

determining a rotary frequency causing the resonance;

selecting a blade vibration to be suppressed, said vibration being associated with a $k^{5h}$ rotary frequency of the rotary; and, distributing the cavities for disturbing the flow over the circumference in such a way that an excitation with a $k^{th}$ multiple of the rotary frequency takes place, a sum of the angular positions of successive cavities in the circumferential direction being chosen so that the blade vibrations are reduced.

2. A method for operating a device for reducing one or more resonant vibrations of rotor blades in turbomachines including at least one cavity extending through a casing wall in the region of rotor blade tips for disturbing a flow between a rotating blade tip and the casuing wall which bounds a flow duct, said cavities being arranged over a circumference of the casing, and arranged between axial planes bounded by an inlet and an outlet edge of the rotor blades at an open cross section of the circumference facing the flow duct, comprising the steps of:

determining a rotary frequency causing the resonance;

selecting a blade vibration to be suppressed, said vibration being associated with a $k^{th}$ rotary frequency of the rotor;

distributing the cavities for disturbing the flow over the circumference; and, injecting a gaseous medium on to the tips of the rotor blades so that the blade vibrations are reduced.

* * * * *